United States Patent
Gummow et al.

(10) Patent No.: US 8,914,935 B2
(45) Date of Patent: *Dec. 23, 2014

(54) DISPOSABLE PREMOISTENED MULTILAYERED CLEANING WIPE

(71) Applicant: The Procter & Gamble Company, Cincinnati, OH (US)

(72) Inventors: Jonathan David Gummow, Loveland, OH (US); Brian Joseph Roselle, Fairfield, OH (US)

(73) Assignee: The procter & Gamble Company, Cincinnati, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/657,241

(22) Filed: Oct. 22, 2012

(65) Prior Publication Data

US 2014/0109331 A1    Apr. 24, 2014

(51) Int. Cl.
*A47L 13/17* (2006.01)

(52) U.S. Cl.
USPC ............... 15/104.93; 15/209.1; 15/229.11

(58) Field of Classification Search
CPC ................................................ A47L 13/17
USPC ..................... 15/104.93, 209.1, 229.11
See application file for complete search history.

(56) References Cited

U.S. PATENT DOCUMENTS

| | | | |
|---|---|---|---|
| 4,601,938 A * | 7/1986 | Deacon et al. | 428/153 |
| 4,797,310 A | 1/1989 | Barby et al. | |
| 5,628,097 A | 5/1997 | Benson et al. | |
| 5,804,286 A | 9/1998 | Quantrille et al. | |
| 5,840,675 A | 11/1998 | Yeazell | |
| 5,895,504 A | 4/1999 | Sramek et al. | |
| 5,916,661 A | 6/1999 | Benson et al. | |
| 6,436,216 B1 | 8/2002 | Grover | |
| 6,720,279 B2 | 4/2004 | Cree et al. | |
| 6,993,805 B2 | 2/2006 | Prodoehl et al. | |
| 7,030,046 B2 | 4/2006 | Wong et al. | |
| 7,696,109 B2 | 4/2010 | Ouellette et al. | |
| 7,917,985 B2 | 4/2011 | Dorsey et al. | |
| 7,947,086 B2 | 5/2011 | Panandiker et al. | |
| 2006/0052269 A1 | 3/2006 | Panandiker et al. | |

FOREIGN PATENT DOCUMENTS

| | | |
|---|---|---|
| DE | 2611880 | 9/1977 |
| EP | 1789525 B1 | 11/2011 |
| WO | 2009/028952 A1 | 3/2009 |

OTHER PUBLICATIONS

U.S. Appl. No. 13/657,231, filed Oct. 22, 2012, Gummow et al.
U.S. Appl. No. 13/967,708, filed Aug. 15, 2013, Gummow et al.
U.S. Appl. No. 13/967,723, filed Aug. 13, 2013, Gummow et al.
PCT Search Report and Written Opinion for PCT/US2013/066019 dated Jan. 2, 2014.

* cited by examiner

*Primary Examiner* — Randall Chin
(74) *Attorney, Agent, or Firm* — Gary J. Foose; Larry L. Huston

(57) ABSTRACT

A multilayered premoistened cleaning wipe having: a liquid permeable first layer joined to a liquid permeable second layer and a core disposed between the first layer and the second layer. A cleaning composition is releasably absorbed in the core. The cleaning composition has between about 0.001% to about 10% by weight of surfactant.

17 Claims, 11 Drawing Sheets

US 8,914,935 B2

DISPOSABLE PREMOISTENED MULTILAYERED CLEANING WIPE

FIELD OF THE INVENTION

Disposable premoistened multilayered cleaning wipes.

BACKGROUND OF THE INVENTION

People come into contact with many surfaces in their normal everyday lives. The propensity for surfaces to harbor viruses, bacteria, dust, dander, soil, grease, hair, and like materials is well known. As people come into contact with surfaces as they move about, they are exposed to these nefarious materials. Exposure to viruses and bacteria can result in illness. Exposure so dust, dander, and pet hair can cause respiratory distress. Exposure to soil and grease can result in stained clothing. As such, devices for cleaning surfaces are desirable.

One common device provided to consumers for cleaning surfaces is a premoistened cleaning wipe. Such wipes are commonly single layers of a nonwoven fibrous material, the fibrous material being pulp or polyolefin material. One limitation to such simple common wipes is that the wipe has only one kind of texture and that texture is presumed by marketers to be efficacious on all kinds of surfaces for all kinds of materials deposited on such surfaces.

In reality, the texture of surfaces and the types of materials deposited on such surfaces vary widely. For instance, the texture of the surface of a sofa is vastly different from a countertop surface. The type of cleaning needed to clean the crumbs and hair from a textile at the crease between decorative cording on a sofa and the body of a cushion is wildly different from the type of cleaning needed to clean a hard countertop surface or the body of a textile cushion. Similarly, hair and dust have properties that are largely different from soil.

In view of the wide variety of surfaces that need cleaning and the types of detritus found on surfaces, it is desirable to provide a wipe having particular features that are adapted to clean a wide variety of surfaces and detritus. With these needs in mind, there is a continuing unaddressed need for a disposable premoistened multilayered cleaning wipe having features adapted to clean a wide variety of surfaces and detritus.

SUMMARY OF THE INVENTION

A premoistened cleaning wipe comprising: a liquid permeable first layer joined in facing relationship to a liquid permeable second layer, said first layer comprising a plurality of first apertures and a plurality of second apertures, wherein said first apertures have a larger open area than said second apertures, said cleaning wipe having a longitudinal centerline; a core disposed between said first layer and said second layer; and a free liquid cleaning composition comprising between about 0.001% to about 10% by weight of said liquid cleaning composition of surfactant, said cleaning composition releasably absorbed in said core.

DETAILED DESCRIPTION OF THE INVENTION

As used herein, the term "joined" refers to the condition where a first member is attached, or connected, to a second member either directly; or indirectly, where the first member is attached, or connected, to an intermediate member which in turn is attached, or connected, to the second member either directly; or indirectly.

Cleaning wipes can be practical for consumers to use for cleaning a variety of surfaces found throughout the household. For example, it can be desirable for a consumer to use a wipe to clean counter-top surfaces, upholstery, curtains, furniture surfaces, and the like. In use, the consumer can grasp the wipe and wipe the surface. If the wipe contains a cleaning composition, the process of wiping the surface can expel at least some of the cleaning composition onto the surface. The cleaning composition can contain substances, including surfactants, to help remove soil from the surface being cleaned. As the consumer rubs the wipe against the surface to be cleaned, the wipe can lift soil from the surface being cleaned and contain the soil in the core of the wipe or on the surface of the wipe.

Figure 1:
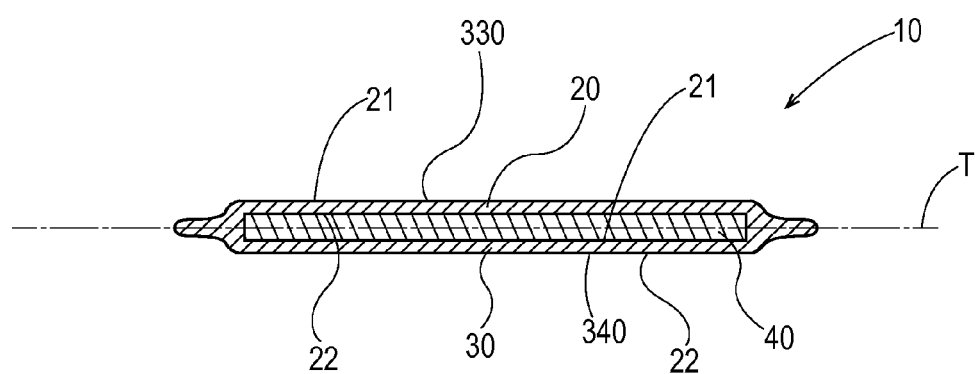
FIG. 1 is a cross sectional view of a wipe taken along the longitudinal axis as marked 1-1' in the plan view of FIG. 5.

A wipe 10 is shown in FIG. 1. As shown in FIG. 1, the wipe 10 can comprise a liquid permeable first layer 20 joined to a liquid permeable second layer 30. The first layer 20 and second layer 30 can be in a facing relationship with one another. The first layer 20 and second layer 30 can individually be generally planar webs of material or materials, each having a first surface 21 and second surface 22 opposing the first surface. The wipe 10 can have a first side 330 and an opposing second side 340.

A core 40 can be between the first layer 20 and the second layer 30. Within the core 40, a cleaning composition can be releasably absorbed.

First Layer

The first layer 20 can be liquid permeable. That is, the first layer 20 can provide for thru-transport of cleaning composition from a core 40 to the first surface 21 of the first layer 20. Once the cleaning composition is on the first surface 21 of the first layer 20, the cleaning composition can be delivered to the surface being cleaned.

The first layer 20 can be superimposed over the core 40. In one embodiment, the first layer 20 is associated with the core 40 by spray-gluing the first layer 20 to the surface of the core 40. In another embodiment, the core 40 can be loosely enrobed by the first layer 20 and second layer 30 without any points of attachment to one or both of the first layer 20 and second layer 30. The first layer 20 can be joined to the core 40 using any technique known in the art for joining webs of material, including, but not limited to, ultrasonic bonding and thermal bonding. It can be practical to provide a thermally embossed pattern on the first layer 20 of the wipe 10 to provide for bonding between the first layer 20 and the core 40.

The first layer 20 can be a material that is compliant and soft feeling. A suitable first layer 20 can be manufactured from a wide range of materials such as polymeric materials, formed thermoplastic films, apertured plastic films, porous films, aperture formed films, reticulated foams, natural fibers (e.g., wood or cotton fibers), woven and non-woven synthetic fibers (e.g., polyester or polypropylene fibers) or from a combination of natural and synthetic fibers. The first layer 20 can be a nonwoven comprising polyolefin fibers. A soft compliant first layer 20 can provide for a pleasant interface between the wipe 10 and the user's hand during use of the wipe 10.

Apertured formed films can be used for the first layer 20 since they are pervious to the cleaning composition and can be non-absorbent and hydrophobic. A surface of a formed film which is in contact with the surface being cleaned can remain relatively dry if the formed film is or is rendered to be hydrophobic. Moreover, apertured formed films are thought to capture and retain lint, fibrous matter such as pet hair, and the like, from the surface being treated, thereby further enhancing the cleaning benefits afforded by the wipe 10. Suitable apertured formed films are described in U.S. Pat. No. 3,929,135, entitled "Absorptive Structure Having Tapered Capillaries", issued to Thompson on Dec. 30, 1975; U.S. Pat. No. 4,324,246, entitled "Disposable Absorbent Article Having A Stain Resistant Coversheet", issued to Mullane and Smith on Apr. 13, 1982; U.S. Pat. No. 4,342,314, entitled "Resilient Plastic Web Exhibiting Fiber-Like Properties", issued to Radel and Thompson on Aug. 3, 1982; and U.S. Pat. No. 4,463,045, entitled "Macroscopically Expanded Three-Dimensional Plastic Web Exhibiting Non-Glossy Visible Surface and Cloth-Like Tactile Impression", issued to Ahr, Louis, Mullane and Ouellete on Jul. 31, 1984; U.S. Pat. No. 4,637,819 issued to Ouellette, Alcombright & Curro on Jan. 20, 1987; U.S. Pat. No. 4,609,518 issued to Curro, Baird, Gerth, Vernon & Linman on Sep. 2, 1986; U.S. Pat. No. 4,629,642 issued to Kernstock on Dec. 16, 1986; and EPO Pat. No. 0,16,807 of Osborn published Aug. 30, 1989. A suitable apertured formed film can be a 25 gram per square meter polyethylene vacuum formed film sold as product ID PT02 by Clopay.

The apertures in such a first layer 20 may be of uniform size or can vary in size, as disclosed in the foregoing published documents, which can be referred to for technical details, manufacturing methods, and the like. Such apertures may also vary in diameter in the manner of so-called "tapered capillaries". Such formed-film cover-sheets with tapered capillary apertures can be situated over the core 40 such that the smaller end of the capillaries face the core 40 and the larger end of the capillary faces outward. The capillary apertures can provide for transport of the spent cleaning composition from the surface being cleaned to the core 40. Apertures in the formed film first layer 20 can have diameters in the range of from 0.1 mm to 1 mm, or as disclosed in the aforesaid patent references.

The first layer 20 may comprise a plurality of first apertures passing through the first layer 20 and a plurality of second apertures passing through first layer 20. The first apertures can be larger than the second apertures. Each of the first apertures can have an open area between about 0.007 $mm^2$ to about 0.8 $mm^2$. Each of the second apertures can have an open area between about 0.8 $mm^2$ and about 12 $mm^2$. Without being bound by theory, it is thought that by providing second apertures of such size that soil that is lifted from the surface being wiped can be transported through the second apertures to the core 40 and be visible on the core 40 when the user inspects the wipe 10 after use. The smaller first apertures can provide for fluid transport through the first layer 20 both when the cleaning composition is expelled from the wipe 10 and retrieved by the wipe 10 from the surface being cleaned during use. Further, a combination of smaller and larger apertures can be practical for providing for adequate fluid transport through the first layer yet still feel dry to the touch when the user uses her hand to hold the wipe 10 to rub the surface being cleaned.

The first layer 20 can be hydrophobic. However, if desired in one embodiment, the outer and/or inner surfaces of the first layer 20 can be made hydrophilic by treatment with a surfactant which is substantially evenly and completely distributed throughout the surface of the first layer 20. This can be accomplished by any of the common techniques well known to those skilled in the art. For example, the surfactant can be applied to the first layer 20 by spraying, by padding, or by the use of transfer rolls. Further, the surfactant can be incorporated into the polymeric materials of a formed film first layer 20. Such methods are disclosed in U.S. Pat. No. 5,009,653.

The first layer 20 can be a laminate of an apertured formed film as described previously and a nonwoven. The nonwoven can be made of one or more types of fibers such as those selected from the group consisting of polyester, polyethylene, polypropylene, bi-component fibers, wood, cotton, rayon, and combinations thereof. The nonwoven can be formed by known nonwoven extrusion processes such as those selected from the group consisting of melt blowing, spunbonding, carding, and combinations thereof. The nonwoven can be extensible, elastic, or inelastic. The nonwoven web can comprise polyolefin fibers. The polyolefin fibers can be selected from the group consisting of polypropylene, polyethylene, ethylene copolymers, propylene copolymers, and butane copolymers. The nonwoven can be a 28 gram per square meter 50/50 polyethylene sheath/polypropylene core bi-component fiber. The nonwoven can be a laminate of a plurality of nonwoven webs. For instance, the nonwoven can comprise a first layer of spunbonded polypropylene having a basis weight from about 6.7 grams per square meter to about 271 grams per square meter, a layer of melt blown polypropylene having a basis weight from about 6.7 to about 271 grams per square meter, a layer of melt blown polypropylene having a basis weight from about 6.7 grams per square meter to about 136 grams per square meter, and a second layer of spunbonded polypropylene having a basis weight from about 6.7 grams per square meter to about 271 grams per square meter. The nonwoven can be a spunbonded nonwoven or a melt blown nonwoven having a basis weight from about 6.7 grams per square meter to about 339 grams per square meter. The nonwoven can be a 28 gram per square meter 50/50 polyethylene sheath/polypropylene core bi-component fiber. The nonwoven fibers can be joined by bonding to form a coherent web structure. The bonding can be selected from the group consisting of chemical bonding, thermobonding, point calendaring, hydroentangling, and needle punching.

The nonwoven can be joined to an apertured formed film using techniques known in the art including melt bonding, chemical bonding, adhesive bonding, ultrasonic bonding, and the like.

Figure 2:
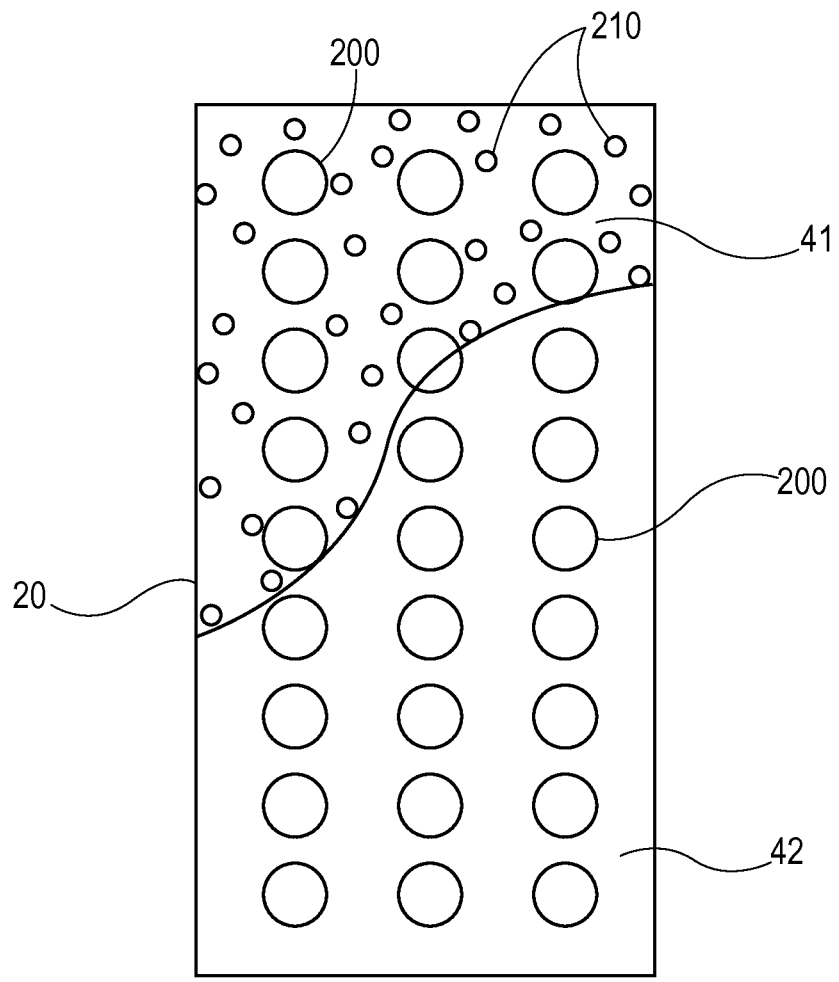
FIG. 2 is a plan view of a first layer.

A laminate of a nonwoven and apertured formed film can be formed as described in U.S. Pat. No. 5,628,097, issued to Benson and Curro, on May 13, 1997, to form the first layer 20. For such a laminate structure, the first layer 20 may comprise a plurality of first apertures 200 passing through the first layer 20 (i.e. both the apertured formed film 41 and nonwoven 42) and a plurality of second apertures 210 passing through the apertured formed film 41 but not the nonwoven 42, as shown in FIG. 2, which is an embodiment of a first layer 20 of the wipe 10. That is, the nonwoven 42 can be free from the second apertures 210. The first apertures 200 can be larger than the second apertures. Each of the second apertures 210 can have an open area between about 0.007 mm$^2$ to about 0.8 mm$^2$. Each of the first apertures 200 can have an open area between about 0.8 mm$^2$ and about 12 mm$^2$. Without being bound by theory, it is thought that by providing first apertures 200 of such size that soil that is lifted from the surface being wiped can be transported through the first apertures 200 to the core 40 and be visible on the core 40 when the user inspects the wipe after use. The second apertures 210, which can be smaller than the first apertures 200, can provide for fluid transport through the first layer 20 both when the cleaning composition is expelled from the wipe 10 and retrieved by the wipe 10 during use. Further, a combination of smaller and larger apertures can be practical for providing for adequate fluid transport through the first layer yet still feel dry to the touch when the user uses her hand to rub the surface being cleaned with the wipe 10. The first apertures 200 can be sized and dimensioned such that a user is able to view the core 40 through such apertures.

The first layer 20 can comprise an apertured film. For instance, the first layer 20 can be a 25 gram per square meter polyethylene vacuum formed film sold as product ID PT02 by Clopay. The first layer 20 can comprise a laminate of a film and a nonwoven having apertures through the laminate. The first layer 20 can comprise a laminate of an apertured film and a nonwoven. The first layer 20 can comprise a laminate of an apertured film having first apertures 200 and a nonwoven, the apertured film and nonwoven both having first apertures 200 there through. The first layer 20 can comprise a fibrous material, such as a fibrous nonwoven comprising polyolefin fibers. The first layer 20 can be an apertured fibrous material, such as an apertured fibrous nonwoven comprising polyolefin fibers.

Core

The core 40 can be a material that can releasably absorb a cleaning composition. In practice, the voids within the core 40 can act as a reservoir for the cleaning composition, the cleaning composition being stored within the capillaries within the core 40. The core 40 can be a fibrous material in which the capillaries are provided by the interstitial spaces between the fibers of the core 40. The core 40 can be an open celled foam in which the capillaries are provided by the interconnected pores within the foam. The core 40 can comprise a nonwoven. An economical core 40 can be provided by a nonwoven comprising polyolefin fibers.

The core 40 can comprise a layer of cellulosic material. The core can comprise an 80 gram per square meter nonwoven of bicomponent fibers, the bicomponent fibers comprising a polyethylene sheath and a polyethylene terephthalate core having a loft of about 2.5 mm. The bicomponent fibers can provide for structural integrity of the core 40 when bonded. Having an appreciable weight fraction of the core 40 made of cellulose can be economical and technically sound since cellulose is known to highly absorbent.

The core 40 can comprise a multi bonded air-laid core comprising about 15% by weight bicomponent fibers having a polyethylene sheath and polyethylene terephthalate core, about 2.5% by weight latex, about 82% pulp, and a basis weight of about 135 grams per square meter. The bicomponent fibers can provide for structural stability and rigidity of the core 40 and the latex can aid in bonding the different components of the core 40 together.

The core 40 can comprise a thermally bonded air-laid core comprising about 18% by weight bicomponent fibers having a polyethylene sheath and polypropylene core and about 82% pulp.

The core 40 can comprise a laminate of an 80 gram per square meter nonwoven of bicomponent fibers, the bicomponent fibers comprising a polyethylene sheath and a polyethylene terephthalate core having a loft of about 2.5 mm and two layers of a multi bonded air-laid core comprising about 15% by weight bicomponent fibers having a polyethylene sheath and polyethylene terephthalate core, about 2.5% by weight latex, about 82% pulp, and a basis weight of about 135 grams per square meter.

The core 40 can comprise open celled foam. For instance, the core 40 can comprise open celled foam formed from a high internal phase emulsion, such as the open celled foam described in U.S. Pat. No. 5,387,207, issued to Dyer, DesMarais, LaVon, Stone, Taylor, and Young, on Feb. 7, 1995. Open celled foams can be desirable since they can provide for a large storage volume of cleaning composition relative to the mass of the core 40.

The core 40 can comprise a material selected from the group consisting of polyolefin fibers, cellulose fibers, rayon, open celled foam, and combinations thereof.

The functions of the core 40 are to store a cleaning composition prior to use, dispense cleaning composition when the wipe 10 is used to clean a surface, reabsorb spent cleaning composition after cleaning, and retain soil that has been removed by the cleaning effort. The core can have a storage volume of about 19 ml. The core can have a storage volume of between about 5 mL and about 30 mL in an uncompressed state. The core can have a storage volume of between about 12 mL and about 25 mL in an uncompressed state. The core can have a storage volume of between about 16 mL and about 25 mL in an uncompressed state.

Second Layer

The second layer 30 can be liquid permeable. That is, the second layer 30 can provide for thru-transport of liquid cleaning composition from a core 40 to the second surface 22 of the second layer 30. The second layer 30 can be superimposed under the core 40 so that the core 40 is between the first layer 20 and second layer 30. In one embodiment, the second layer 30 is associated with the core 40 by spray-gluing the second layer 30 to the surface of the core 40. In another embodiment, the core 40 is loosely enrobed by the first layer 20 and second layer 30 without any points of attachment. The second layer 30 can be joined to the core 40 using any technique known in the art for joining webs of material, including, but not limited to, ultrasonic bonding and thermal bonding.

The second layer 30 can be a material that is compliant and soft feeling. The second layer 30 can be any of the materials as described previously as being suitable for the first layer 30. It can also be practical for the second layer 30 to be an abrasive layer.

Abrasive Layer

The wipe 10 can have an abrasive layer. The abrasive layer of the wipe 10 can be the second layer 30 of the wipe 10. Arranged as such, the first layer 20 can provide for a soft compliant wiping surface and the abrasive layer can be on the side of the core 40 opposite the first layer 20. In a simple construction, the wipe 10 can have 3 layers, a first layer 20, an abrasive layer being the second layer 30, and a core 40 disposed between the abrasive layer and first layer 20.

It is contemplated that the second layer 30 can be positioned such that the second layer 30 is between the abrasive layer and the core 40. For instance, as shown in FIG. 1, the second layer 30 can be the abrasive layer of the wipe 10. If the abrasive layer is the second layer 30, other layers of material may be between the abrasive layer and core 40, but are not necessarily needed.

If other layers are provided between the abrasive layer and the core 40, such other layers can have other functional attributes and one or more of those layers can be considered to be the second layer 30 as described herein.

The abrasive layer can be liquid permeable. That is, the abrasive layer can provide for thru-transport of liquid from a core 40 from the first surface 21 to the second surface 22 of the abrasive layer. The abrasive layer can be superimposed over the core 40. In one embodiment, the abrasive layer is associated with the core 40 by spray-gluing the abrasive layer to the surface of the core 40. In another embodiment, the core 40 is loosely enrobed by the first layer 20 and abrasive layer without any points of attachment. The abrasive layer can be bonded to the core 40 using any technique known in the art for joining webs of material, including, but not limited to, ultrasonic bonding and thermal bonding.

A suitable abrasive layer can be manufactured from a wide range of materials such as polymeric materials, formed thermoplastic films, apertured plastic films, porous films, aperture formed films, reticulated foams, natural fibers (e.g., wood or cotton fibers), woven and non-woven synthetic fibers (e.g., polyester or polypropylene fibers) or from a combination of natural and synthetic fibers.

The abrasive layer can be a material that provides an abrasive surface of the wipe 10. In use, an abrasive layer that is rough can help to dislodge soil from the surface being cleaned and can help pick up loose fibers such as dust, lint, dander, pet hair, and the like from the surface being cleaned. Further, an abrasive layer may help fluff up the fibers in textiles that are being cleaned thereby allowing for better application of the cleaning composition to the textile surface being cleaned.

The abrasive layer can comprise a net material. The net material can be a net comprised of at least two sets of strands wherein each set of strands crosses and interconnects another set of strands at a substantially fixed angle wherein strands in each set extend along a respective direction and are in substantially co-planar, spaced-apart relationship. The net material can be polypropylene or other suitably durable polyolefin material. The abrasive layer can be a material such as that sold under the trade name DELNET, by Delstar Technologies, Inc., Middletown, Del.

Figure 3A:
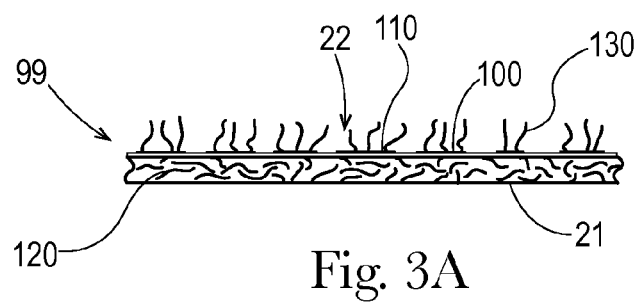
FIG. 3A is profile view of a portion of an abrasive layer.
Figure 3B:
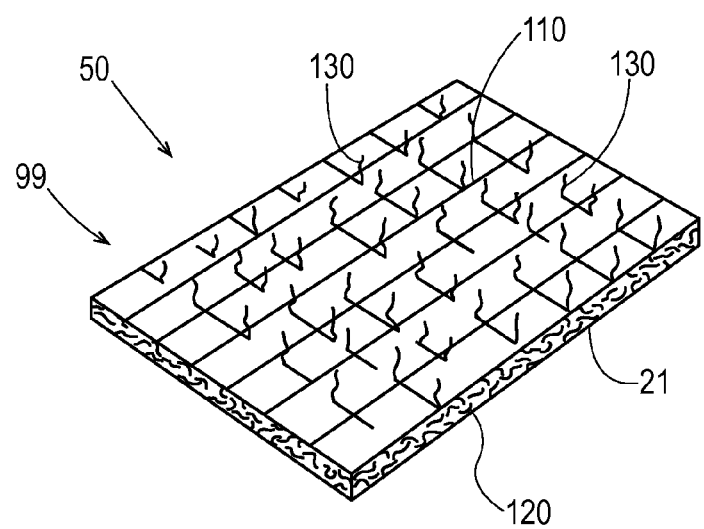
FIG. 3B is perspective view of a portion of an abrasive layer.

The abrasive layer can comprise a composite material 99 such as any of the materials described in U.S. Pat. No. 7,917,985 issued to Dorsey et al. on Apr. 5, 2011. For instance the abrasive layer 50 can comprise a net material 100 comprising at least two sets of strands 110 wherein each set of strands 110 crosses and interconnects another set of strands 110 at a substantially fixed angle wherein strands 110 in each set of strands 110 extend along a respective direction and are in substantially co-planar, spaced-apart relationship that is bonded to a substrate 120 wherein a plurality of the strands 110 are broken forming raised whiskers 130 that extend away from the substrate 120, as shown in FIGS. 3A and 3B. The abrasive layer 50 can be positioned to form the wipe 10 such that the whiskers 130 extend away from the core 40. That is, the second side of the wipe 10 can have whiskers 130. As the wipe 10 can be constructed, the substrate 120 can be between the net material 100 and the core 40. Together, the net material 100 and substrate 120 can form an outer layer of the wipe 10 that is the second side of the wipe 10.

The net material 100 can be a 51 grams per square meter polypropylene net (style number RO412-10PR) made by Delstar Technologies, Inc., Middletown, Del., and sold under the trade name DELNET. The net material can have 40 strands per inch in the machine direction and 13 strands per inch in the cross direction that are bonded to one another, together forming the two sets of strands 110. The net material can be polypropylene fine square structure net referred to as PF40 and sold by Smith and Nephew Extruded Films, East Yorkshire, England. The net material 100 can be thermally bonded to one or more layers of a substrate 120 to form composite 99.

The substrate 120 can be a nonwoven or woven material. The substrate can be one or more layers of 60 grams per square meter 50% polypropylene 50% rayon spun laced nonwoven fabric. The substrate 120 can be a 60 gram per square meter polypropylene polyethylene copolymer. The substrate 120 can be SOFSPAN 120, available from Fiberweb. The composite 99 can be stressed to break a plurality of the strands 110 to form the whiskers 130. The stress can be provided, for instance, by a ring rolling process as described in U.S. Pat. No. 7,917,985 issued to Dorsey et al. on Apr. 5, 2011.

In one embodiment of the wipe 10, it can be practical for the abrasive layer 50 to be translucent. Such translucency can provide the user the ability to examine the second side of the wipe and observe that a colored second layer 30 is between the abrasive layer 50 and the core 40. A translucent abrasive layer 50 can be provided by an uncolored or lightly colored abrasive layer.

Free Liquid Cleaning Composition

To aid in cleaning, the wipe 10 can be provided with a free liquid cleaning composition. The free liquid cleaning composition can be releasably absorbed in the core 40. That is, the volume of the free liquid cleaning composition is held within the voids of the core 40 by capillary forces. For example, the free liquid cleaning composition can be held by surface tension within the interstitial spaces between fibers or within the cells of an open celled foam forming the core 40. The free liquid cleaning composition can be expelled from the core 40 by compressing the core 40. The core 40 can reabsorb spent cleaning composition into voids within the core 40 by capillary forces. The capillary forces can act to draw spent cleaning composition through the first layer 20 to the core 40.

One practical formulation of the cleaning composition is set forth in Table 1.

TABLE 1

Cleaning composition formulation.

| Ingredient | % Active by Weight | Function |
| --- | --- | --- |
| Distilled water | Quantity sufficient to balance to 100% | Solvent |
| Sodium lauryl sulfate | 0.90 | Anionic surfactant |
| C12/14 amine oxide | 0.30 | Cationic surfactant |
| Glycol Ether PPh | 1.50 | Solvent |
| Citric Acid 50% | Trace as needed to target pH of 7 | pH adjustment, builder |
| Korolone B-119 | 0.01 | Preservative |
| Perfume | 0.02 | Perfume |
| Dow Corning DC 2310 | 0.02 | Antifoam |

The cleaning composition can comprise between about 0.001% to about 10% by weight of the liquid cleaning composition of surfactant. The cleaning composition can comprise between about 0.1% to about 5% by weight of the liquid cleaning composition of surfactant. The cleaning composition can comprise between about 0.1% to about 4% by weight of the liquid cleaning composition of surfactant. The cleaning composition can comprise between about 0.1% to about 3% by weight of the liquid cleaning composition of surfactant. The cleaning composition can comprise between about 0.1% to about 2% by weight of the liquid cleaning composition of surfactant. Without being bound by theory, it is thought that lower mass fractions of surfactant might result in less observable residual cleaning composition left on a surface after cleaning. Higher mass fractions of surfactant might result in ringing and spotting from a locally heavy application of the cleaning composition to the surface being cleaned.

The cleaning composition can comprise 0.001% to 0.1% by weight of an antifoam compound. A non-limiting example of an antifoam compound is Dow Corning DC 2310.

Colored Regions

The wipe 10 as contemplated herein can have two sides, each having a different function. For instance, one side of the wipe can have a soft compliant surface for wiping a surface or fabric to remove light soiling, dust, and lint and the other side can have an abrasive surface that can dislodge agglomerations of soil or alter the surface of a textile so that a cleaning composition can be effectively delivered to and retrieved from the textile.

One problem associated with a wipe 10 having two sides with each side providing a different function is that the difference between the two sides may not be immediately apparent to the user. This can be especially true if the user is looking at only one side of the wipe 10. Surprisingly, color signals that are visible to the user when looking at only one side of the wipe 10 can be used to signal the user that the opposite side of the wipe 10 has a different function.

Figure 4:
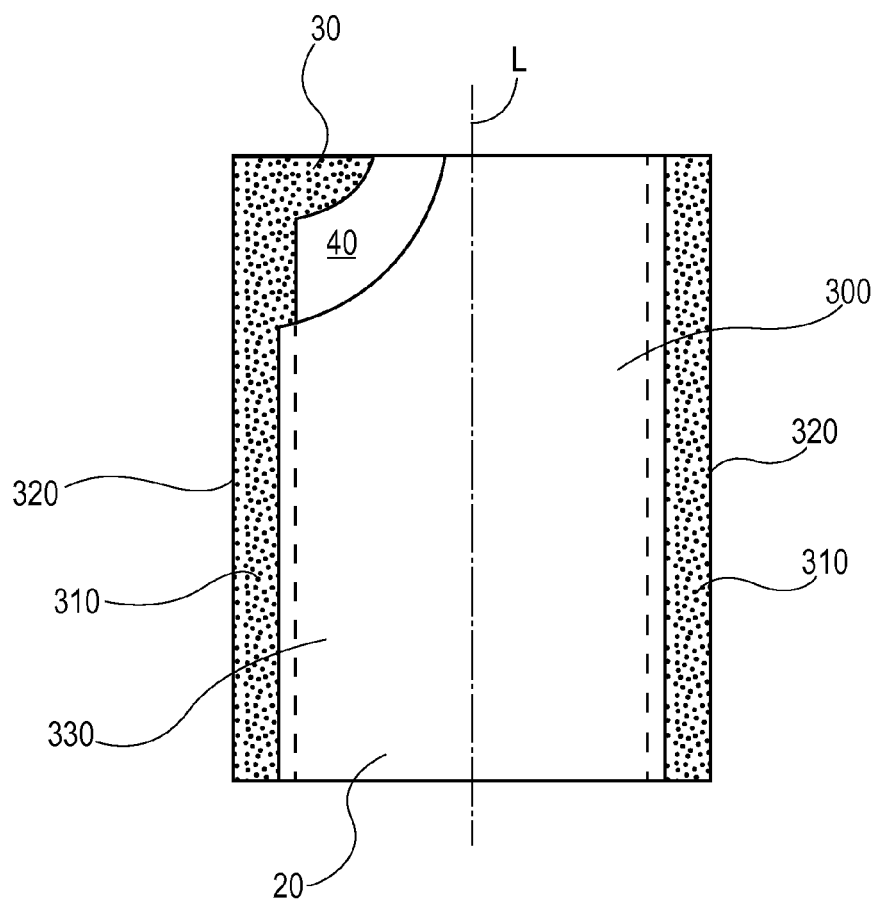
FIG. 4 is a plan view of the wipe shown in FIG. 1 having colored regions.
Figure 5:
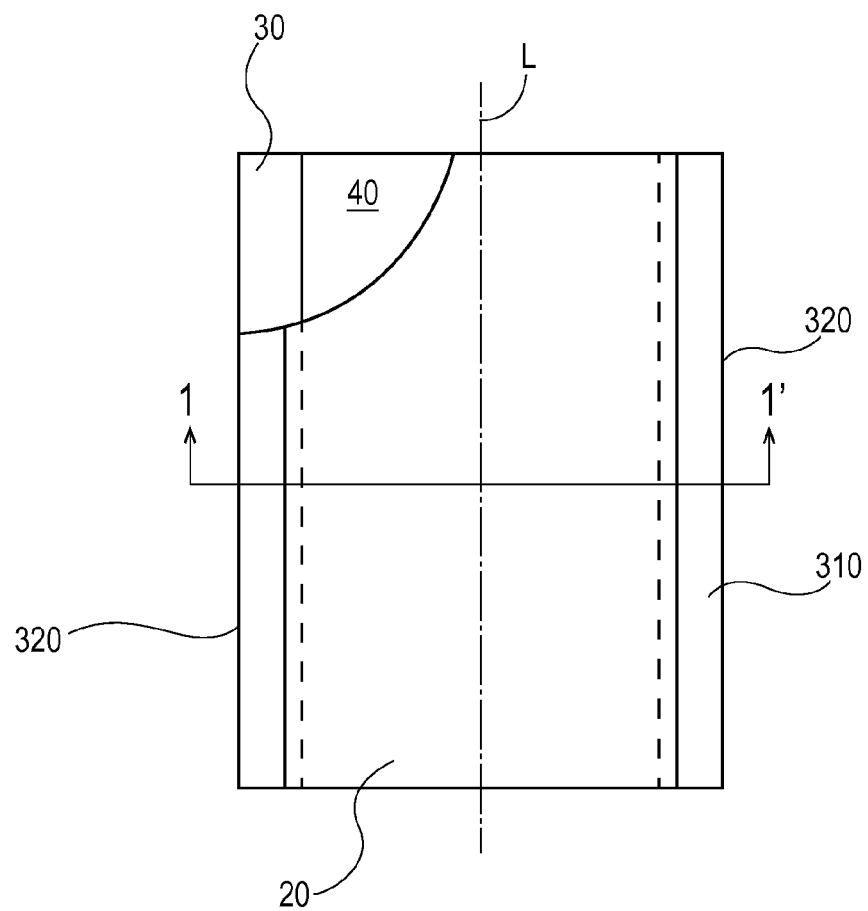
FIG. 5 is a plan view of the wipe shown in FIG. 1 without colored regions.

A premoistened wipe 10 having a longitudinal centerline L is shown in FIGS. 4 and 5. The wipe 10 can have a liquid permeable first layer 20 joined to a liquid permeable second layer 30. The first layer 20 and the second layer 30 can be in a facing relationship with one another. By facing relationship, it is meant that the two components rest generally flat relative to one another so that one planar surface of one component faces a planar surface of the other component, like a floor mat rests on the floor. Two components can be in a facing relationship yet still have other components positioned between the two components that are in a facing relationship, for instance like a sandwich that has a slice cheese positioned between two slices of bread that are in a facing relationship.

The wipe 10 can have a first colored region 300 disposed on the longitudinal centerline L between a pair of opposing second colored regions 310. Each of the second colored regions 310 extends laterally beyond the first colored region 300 to a respective transverse edge 320. Laterally is taken to be in a direction orthogonally away from the longitudinal centerline L. A core 40 can be disposed between the first layer 20 and the second layer 30. The first colored region 300 and the second colored region 310 can differ in color. Without being bound by theory, it is thought that by having the second colored regions 310 disposed along the transverse edges 320, the user will be led to more closely inspect the opposing side of the wipe 10 to learn that the opposing side has a different function or characteristic. The contrast in color between the portion of the central part of the wipe 10 along a portion of the longitudinal centerline L can lead the consumer to more closely inspect the opposing sides of the wipe 10.

The second colored regions 310 can be provided in a number of manners. For instance, the second colored region 310 can be provided by the second layer 30. The second layer 30 can be at least partially visible through the first layer 20 in the second colored regions 310. Visibility of the second layer through the first layer 20 can be provided for by bonding the second layer 30 and first layer 30 to one another with no other component there between or only a translucent component between the first layer 20 and second layer 30. For instance, the wipe 10 can be designed so that the core 40 is absent between the first layer 20 and second layer 30 in the second colored regions 310. The first layer 20 and the second layer 30 can be joined directly to one another so that the first layer 20 and second layer 30 are in direct contact with one another.

The first colored region 300 can be provided for by the constituent color of the first layer 20. For example, the first layer 20 can have the constituent color of white. Such color can be provided for by a colored first layer 20 with the color being provided for by a material selected from the group consisting of dye, pigment, ink, and combinations thereof. The color of the first layer 20 can be provided for with a pigment such as titanium dioxide.

The first colored region 300 can be provided a color by inkjet printing, printing, gravure printing, flexographic printing, lithographic printing, and screen printing. The first layer 20 can be provided with a color by using pigments and/or dyes. For instance, if the first layer 20 is a fibrous material, the fibers may contain a whitening agent, for example titanium dioxide, that is included in the fibrous material at the time of manufacture of the constituent fibers.

The second colored regions 310 can be provided a color by inkjet printing, printing, gravure printing, flexographic printing, lithographic printing, and screen printing. The second colored regions 310 can be provided by printing on the first layer 20. Such printing, if present, can be provided for on either or both of the first side 20 or second side 21 of the first layer 20. The second colored regions 310 can be part of the first layer 20, the second layer 30, or another layer of material that when colored is visible from the first side 330 of the wipe 10.

It can be practical for the first colored region 300 to be part of the first layer 20 and the second colored regions 310 can be part of the second layer 30. For instance, as shown in FIG. 4, the core 40 is between the first layer 20 and the second layer 30 except in the second colored regions 310. If the entire second layer 30 is colored, the core 40 can be opaque enough so that core 40 obscures or partially obscures at least a portion of the second layer 30 beneath the core 40 when said first layer 20 is viewed from the first side 330. That is, the color of the second layer 30 that provides the second colored regions 310 is not visible or at least entirely visible through the combination of the core 40 and first layer 30 in portions away from the second colored regions 310 when the first layer 20 is viewed by an observer. The first layer 20 can be translucent enough such that when joined to the second layer 30, the color of the second layer 30 is visible through the first layer 20.

As shown in FIGS. 4 and 5, the first layer 20 and second layer 30 can be joined to one another along each transverse edge 320 and the second layer 30 can be visible through at least a portion of the first layer proximal the transverse edges 320. The first layer 20 can be an apertured film, and apertured formed film, a nonwoven, woven material, or a composite material of such constituents.

In one embodiment of the wipe 10, the first layer 20 can form the first side 330 of the wipe 10 and the wipe 10 can have a second side 340 opposing the first side 330 of the wipe 10. The first side 330 within the first colored region 300 and the second side 340 of the wipe 10 can be measured by a Hunter Reflectance Meter test according to the colors L*, a*, and b*, the L*, a*, and b* values. The first side 330 within the first colored region 300 and the second side 340 of the wipe 10 at a location can differ in color by a magnitude calculated according to the formula $\Delta E=[(L^*_X-L^*_Y)^2+(a^*_X-a^*_Y)^2+(b^*_X-b^*_Y)^2]^{1/2}$, wherein $\Delta E$ is greater than about 5, or alternatively greater than about 10.

Reflectance color is measured using a Hunter Reflectance Meter test that employs using the Hunter Lab LabScan XE reflectance spectrophotometer obtained from Hunter Associates Laboratory of Reston, Va. A wipe 10 is tested at an ambient temperature between 18.3° C. and 23.9° C. and a relative humidity between 50% and 80%.

The spectrophotometer is set to the CIELab color scale and with a D65 illumination. The Observer is set at 10° and the Mode is set at 45/0°. Area View is set to 0.125" and Port Size is set to 0.125". The spectrophotometer is calibrated prior to sample analysis utilizing the black glass and white reference tiles supplied from the vendor with the instrument. Calibration is done according to the manufacturer's instructions as set forth in LabScan XE User's Manual, Manual Version 1.1, August 2001, A60-1010-862. If cleaning is required of the reference tiles or samples, only tissues that do not contain embossing, lotion, or brighteners should be used (e.g., PUFFS tissue).

To help the user detect the presence of the different surfaces of the wipe 10 each having a different function or characteristic, it can be practical to have the first colored region 300 and the second colored region 310. As shown in FIG. 4, the first layer 20 can form a first side 330 of the wipe 10. The first colored region 300 and the second colored region 310 can be measured by a Hunter Reflectance Meter test according to the colors L*, a*, and b*, the L*, a*, and b* values being measured from the first side 330, wherein said first colored region 300 and the second colored region 310 differ in color by a magnitude calculated according to the formula $\Delta E=[(L^*_X-L^*_Y)^2+(a^*_X-a^*_Y)^2+(b^*_X-b^*_Y)^2]^{1/2}$, wherein $\Delta E$ is greater than about 2. Herein, the 'X' in the equation can represent the first region 300 or the second region 310. 'Y' in the equation can represent the first region 300 or the second region 310. 'X' and 'Y' are not to be the same object. In other words, for any particular evaluation of the difference in color, the location of 'X' is not the same as the location of 'Y'.

A difference in color of $\Delta E$ greater than about 2 provides a difference in color that can appear distinct to an observer. The greater the $\Delta E$ between the color of the first region 300 and the color of the second region 310, the more readily distinguishable the two colors are. Thereby, the difference in color of the first region 300 and the second region 310 can be readily distinguishable by the user.

The $\Delta E$ between the color of the first region 300 and the second region 310 can be greater than about 3. The $\Delta E$ between the color of the first region 300 and the second region 310 can be greater than about 5. The $\Delta E$ between the color of the first region 300 and the second region 310 can be greater than about 10.

The $\Delta E$ between the color of the first region 300 and the second region 310 can be greater than about 20. The $\Delta E$ between the color of the first region 300 and the second region 310 can be greater than about 30. The $\Delta E$ between the color of the first region 300 and the second region 310 can be greater than about 40. The $\Delta E$ between the color of the first region 300 and the second region 310 can be greater than about 50. The $\Delta E$ between the color of the first region 300 and the second region 310 can be greater than about 60. The difference in color $\Delta E$ between the first region 300 and the second region 310 can be greater than any integer number greater than 2.

By having the difference in color between the first region 300 and second region 310 large enough, the user can be driven to more closely inspect the opposing surfaces of the wipe 10 and learn that the different sides of the wipe 10 can be used for different functions. For instance, in one embodiment it is contemplated that the second side 340 of the wipe 10, which opposes the first side 330 of the wipe 10, can have a color that is a shade of the color of the second region 310. As shown in FIG. 4, the color of the second layer 30, which would be visible from the second side 340 of the wipe 10, can be visible through the first layer 20 in portions of the first layer 20 away from the core 40. The color of the second layer 30 can be particularly visible on the first side 330 of the wipe 10 where the first layer 20 and second layer 30 are joined to one another, either in direct contact with one another or through one or more intermediate layers between the first layer 20 and the second layer 30.

In one embodiment, the color of the first region 300 can be such that the L* value is greater than about 70. Such a color for the first region 300 can be practical such that soil that is lifted from the surface being wiped can be visible on the first layer 20, thereby providing a visual cue that the wipe 10 was successful at removing soil.

The color of the first region 300 can be such that the L* value is greater than about 70 and the a* value is between about −5 and about 5 and a b* is between about −5 and about 5. The color of the first region 300 can be such that the L* value is greater than about 50, which for some types of soils may be light enough for a soil lifted from a surface being treated to be visually apparent on the first layer 20. The color of the first region 300 can be white. The color white is defined as a color having an L* value of greater than about 70, an a* value equal to 0±2, and a b* value equal to 0±2.

The color of the second region 310 can be such that the L* value is less than about 70. The color of the second region 310 can be such that the L* value is less than about 65. Such L* values less than about 70 or less than about 65 may tend to be perceived as relatively dark, as compared to the color of the first region 300 if the color of the first region is relatively light or white.

Wipe

Figure 6:
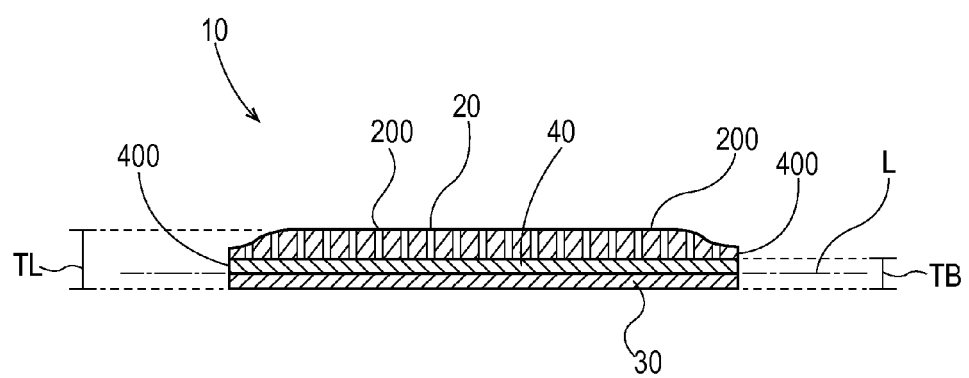
FIG. 6 is cross sectional view of a wipe cut along the longitudinal axis.

The wipe 10 can have a variety of constructs including any of those discussed previously. In the construction shown in FIG. 1, the first layer 20 and second layer 30 can be joined to one another, for instance by melt bonding, chemical bonding, adhesive bonding, ultrasonic bonding, and the like. The first layer 20 and second layer 30 can be joined to one another along the transverse edges 320. The transverse edges 320 are spaced apart away from the longitudinal centerline L. The transverse edges 320 can be straight lines or nonlinear, for instance a decorative scalloped pattern. The first layer 20, second layer 30, and core 40 can be coextensive with one another along the longitudinal axis L, as shown in FIG. 1. The first layer 20, core 40, and second layer 30 can be joined together at the longitudinal ends of the wipe 10, as shown in FIG. 6. In an alternative arrangement, the first layer 20 and second layer 30 can be joined to one another along the transverse edges 320 and along the longitudinal ends to form a pocket in which the core 40 is positioned. In such an arrangement, the first layer 20 and second layer 30 can be longitudinally more extensive than the core 40 so that at the longitudinal ends of the wipe 10, the core 40 is not between the first layer 20 and second layer 30. That is, the longitudinal ends/longitudinal edge bonds of the wipe 10 can be free of material from the core. The first layer 20 and second layer 30 can extend longitudinally beyond the core 40 and extend further away from the longitudinal centerline L than the core 40, thereby forming a pouch within which the core 40 is positioned. Arranged as such, the transverse edges 320 can be free of material from the core 40.

As shown in FIG. 6, the wipe 10 can comprise a pair of longitudinal edge bonds 400 disposed at opposing longitudinal edges of the wipe 10 across the longitudinal centerline L. Each longitudinal edge bond 400 can comprise material from the first layer 20, the core 40, and the second layer 30. By having longitudinal edge bonds 400 that include the core 40, the longitudinal edge bonds 400 can have a greater resistance to bending as compared to other portions of the wipe 10, for instance as compared to the transverse edge bonds 410. The longitudinal edge bonds 400 can have a greater resistance to bending than the transverse edge bonds 410 of the wipe 10. Having a different resistances to bending between these two parts of the wipe 10 can be beneficial in that the stiffer part can be more suitable for cleaning one type of feature, such as the crease between cording and fabric on a sofa, and the more flexible part can be used to lightly brush a delicate surface, such as the leaf of decorative plant.

Resistance to bending can be measured by separating the relevant bond from the wipe and using a two point bending test with the resistance to bending quantified as the force required to deflect the free end of the beam of bond material 10% of the length of the beam of bond material.

Similarly, the longitudinal edge bonds 400 can be thicker than the transverse edge bonds 410, the thickness being measured orthogonal to the longitudinal centerline L and out of plane with respect to the first layer 20 and the second layer 30. This difference in thickness can provide for the availability of the wipe 10 to fit into different size cracks, crevices, and creases.

Stiff longitudinal edge bonds 400 can be useful for cleaning narrow creases and folds in surfaces. If the longitudinal edge bonds 400 are floppy, as might be the case if only the first layer 20 and second layer 30 are bonded to one another to enclose the core 40, it might be difficult for the user to slip the wipe 10 edgewise into a narrow crease, crevice, or fold. It is thought that the stiff longitudinal edge bonds 400 can be useful for cleaning the crease between the sole of a dress shoe and the body of the shoe. The stiff longitudinal edge bonds 400 might also be useful for cleaning the crease between the textile on a sofa and decorative cording that is commonly found around the edges of components of the sofa such as the cushions, arm rests, and decorative contours, where dirt, food crumbs, dander, and pet hair often accumulate. The stiff longitudinal edge bonds 400 might also be useful for cleaning between the keys of a computer keyboard or piano, within the contours of the facings and buttons of electronic devices such as televisions and stereos, around the edges of picture frames, and other hard to reach narrow creases, cracks, and crevices.

If desired, the longitudinal edge bonds 400 can be continuous or intermittent. Continuous longitudinal edge bonds 400 can be stiffer than intermittent longitudinal edge bonds.

Longitudinal edge bonds 400 can be provided for by thermally bonding the first layer 20, second layer 30, and core 40 to one another. As shown in FIG. 6, the longitudinal edge bonds 400 can have a longitudinal edge bond minimum thickness TB and the wipe 10 can have a maximum thickness TL along the longitudinal centerline L. The longitudinal edge bond minimum thickness TB and the maximum thickness TL are both measured orthogonal to the longitudinal centerline L and out of plane with respect to the first layer 20 and the second layer 30. The longitudinal edge bond minimum thickness TB can be less than about 80% of the maximum thickness TL. The longitudinal edge bond minimum thickness TB can be less than about 30% of the maximum thickness TL. Without being bound by theory, it is thought that relatively thin longitudinal edge bonds 400 can be beneficial in that they can readily enter narrow creases, cracks, and crevices and be used to clean such features. Further, by having a fatter part of the wipe 10 somewhat away from the thin longitudinal edge bond 400 the wipe can be stuffed to fit into narrow cracks, creases, and crevices, thereby providing for better cleaning, particularly around the exit from such features which may be the most visually apparent portion of the feature.

The maximum thickness TL of the wipe 10 can be between about 3 mm to about 10 mm, or about 3 mm to about 8 mm, or 3 mm to about 6 mm. Longitudinal edge bonds 400 that comprise the first layer 20, second layer 30, and core 40 can have a longitudinal edge bond minimum thickness TB between about 0.1 mm and 2.4 mm. The thickness of the longitudinal edge bonds 400 and the transverse edge bonds 410 can be controlled by, for example, altering the pressure and/or heat applied that portion of the wipe 10 to form the respective bond. Higher pressure and greater amounts of heat can be associated with stiffer and or thinner bonds.

Figure 7:
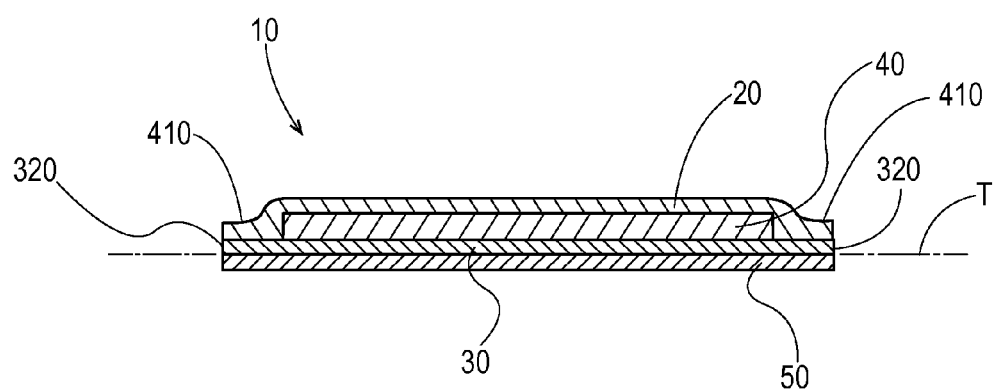
FIG. 7 is a cross sectional view of a wipe taken along the longitudinal axis.

The second layer 30 can be a layer that is an interior component of the wipe 10, as shown in FIG. 7. As shown in FIG. 7, the core 40 is positioned between the first layer 20 and the second layer 30. The second layer 30 can be colored, as described previously, for instance by a dye, pigment, ink, or other technique. The second layer 30 can be between the core 40 and the abrasive layer 50. The abrasive layer 50 can form an exterior surface of the wipe 10 that can be used to dislodge soil from the surface being cleaned. The first layer 20, second layer 30, and abrasive layer 50 can be joined to one another along the transverse edges 320, for instance by thermally bonding the three materials together. The second layer 30, if colored, can be visible through the first layer 20 at positions where the first layer 20 and second layer 30 are joined to one another and the core 40 is not between the first layer 20 and second layer 30.

Figure 8:
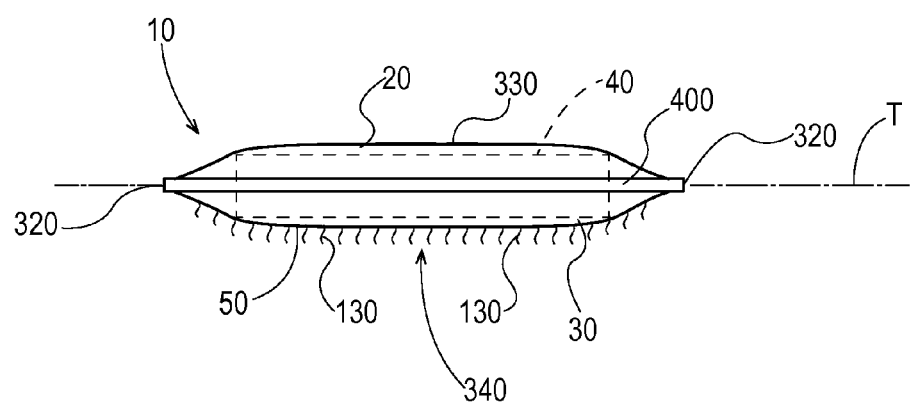
FIG. 8 is a cross sectional view of a wipe taken along the longitudinal axis.

As shown in FIG. 8, the abrasive layer 50 can be the second layer 30. That is, the wipe 10 can comprise first layer 20 and a second layer 30 and a core 40 positioned between the first layer 20 and second layer 30, wherein the second layer 30 is an abrasive layer 50. The abrasive layer 50 can be colored. The abrasive layer 50 can be colored with a material selected from the group consisting of dye, pigment, ink, and combinations thereof.

Figure 9:
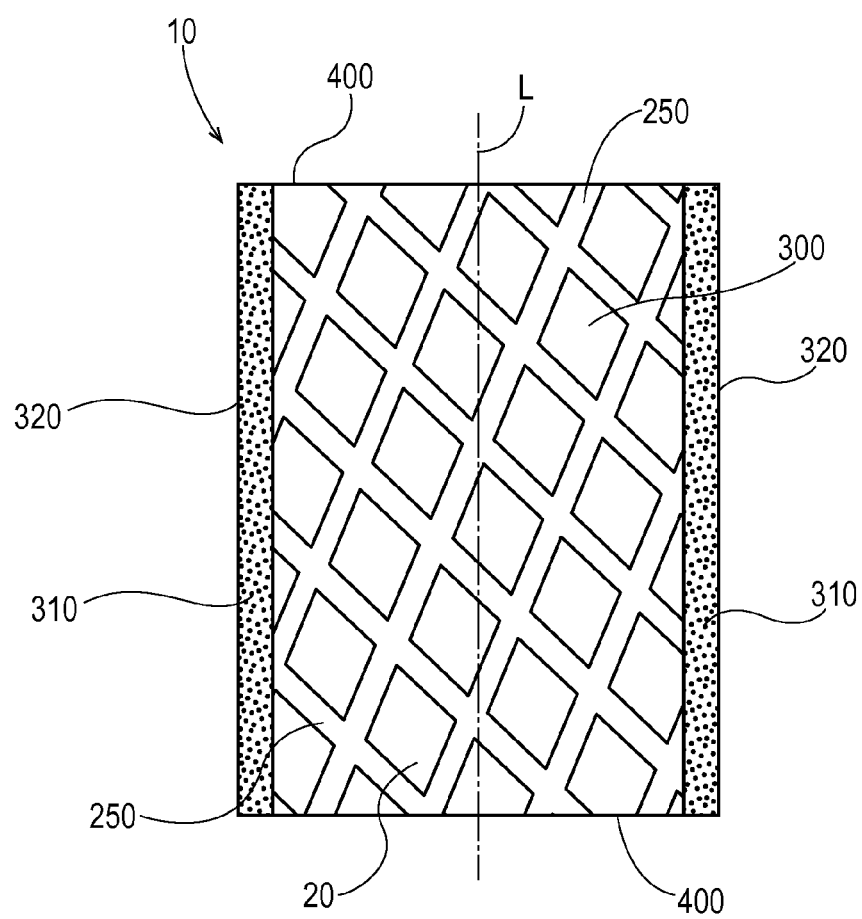
FIG. 9 is a plan view of a wipe having channels and colored regions.
Figure 10:
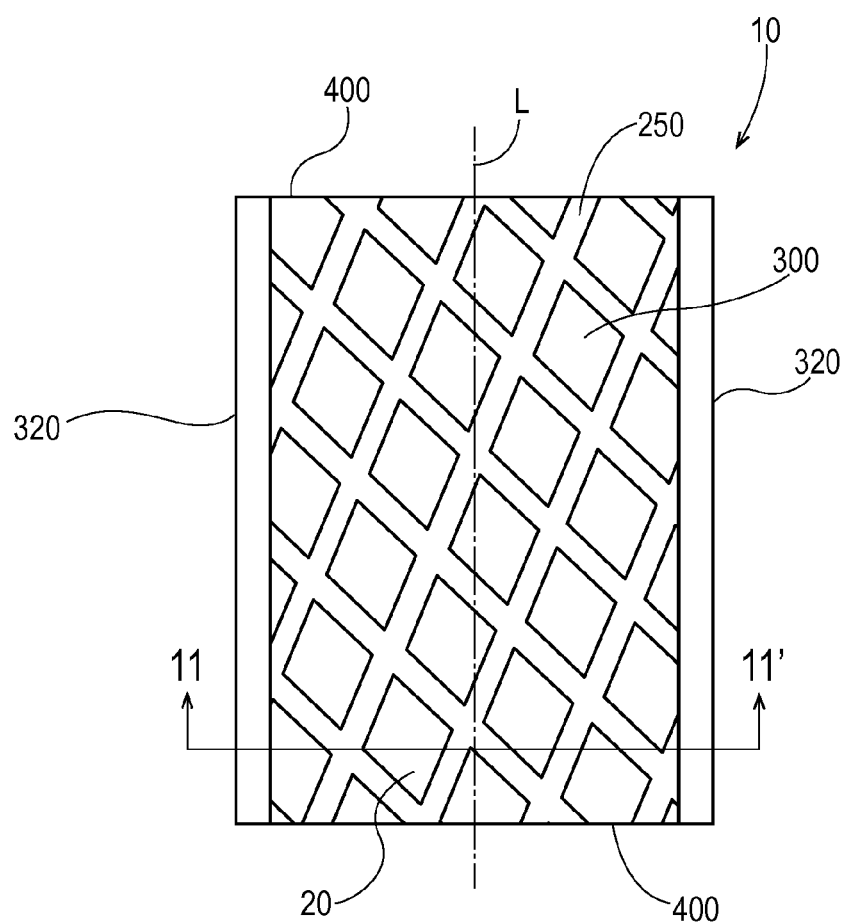
FIG. 10 is a plan view of a wipe having channels.
Figure 11:
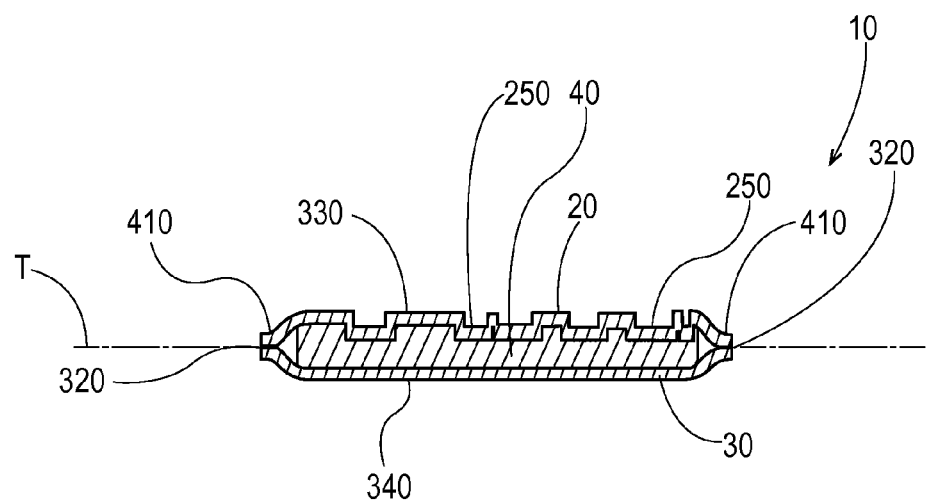
FIG. 11 is a cross sectional view of the wipe shown in FIG. 10 marked 11-11'.

The first layer 20 can form a first side 330 of the wipe 10. As shown in FIGS. 9, 10, and 11, the first side 330 of the wipe 10 can comprise one or more channels 250 embossed into the core 40. Embossed channels 250 can increase the stiffness of the wipe 10 and increase the durability of the wipe 10.

Since the wipe 10 can be designed to use as a hand implement, the wipe 10 can be sized and dimensioned to conform to an adult human hand. For instance, the wipe 10 can have a length, as measured along the longitudinal axis L of between about 8 cm and about 14 cm. The wipe 10 can have a maximum width, as measured orthogonal to the longitudinal axis L and in plane with the first layer 20 of between about 5 cm and about 12 cm.

Fluid Expression

To provide for different sides of the wipe 10 having different functions, it can be practical to make the first side 330 express liquid cleaning composition from the core 40 at a different amount or rate as compared to the second side 340. For instance, if the first side 330 of the wipe 10 is being used by the consumer for wiping a sofa, the user's objective may be removal of light dust and pet hair. The cleaning capability of the wipe 10 for cleaning light dust and pet hair may not require as much cleaning composition to be effective as compared a cleaning effort on more heavily soiled surfaces employing the second side 340 of the wipe 10. As such, it may be beneficial to have first side 330 express liquid more slowly or in a lower quantity than the second side 340. The quantity of liquid cleaning composition expressed from a particular side of the wipe 10 can be quantified by the cumulative wipe fluid loss value. To provide for a marked difference in cleaning composition expression, the first side 330 and second side 340 can each have an individual cumulative wipe fluid loss value and the cumulative wipe fluid loss value of the first side 330 and the cumulative wipe fluid loss value of the second side 340 can differ by more than about 10%. Such a difference can provide for a user noticeable difference in cleaning composition expression from the first side 330 as compared to the second side 340. If desired, the cumulative wipe fluid loss value of the second side 340 can be more than about 10% greater than the cumulative wipe fluid loss value of the first side 330. Such an arrangement can be practical if the first side 330 is designed for light cleaning and the second side 340 is designed for more heavy cleaning.

The cumulative wipe fluid loss value is measured as follows. A stack of layers Ahlstrom filter paper grade 989 supplied by Empirical Manufacturing Company (or equivalent) is provided. The number of layers needs to be sufficient so that at least the bottom 3 layers are substantially dry after completion of the test so that the stack of filter paper is not wetting through. A layer is considered substantially dry if the percent change in the mass of the layer in percent post-test as compared to the pre-test dry mass is less than 1%. The dimensions of each layer of filter paper need to extend laterally beyond the wipe being tested by 13 mm. The filter paper is conditioned in advance of the test for at least 12 hrs at a temperature of 21.1° C.+/−1° C. and a relative humidity of 65% and the measurement of the cumulative wipe fluid loss value is measured under the same conditions. The wipe is temperature conditioned for 12 hours at 21.1° C.+/−1° C. The wipe is tested in its as wetted state.

The wipe being tested, which has cleaning composition absorbed therein, is weighed using a Sartorius E2000D laboratory balance. Then the wipe is placed flat and centered onto the stack of filter paper. A rigid non-porous weight having an area greater than the area of the wipe is applied to the wipe so that the pressure applied to the wipe is 5.59 kPa+/−0.34 kPa. The area used to compute the pressure is the plane area of the wipe minus the area of any bond(s) about the periphery of the wipe.

The pressure is applied to the wipe within 1 second in a manner such that the pressure applied does not exceed 5.59 kPa+/−0.34 kPa at any time during the pressure application and then left on the wipe so that the total pressure is supported by the wipe for 30 seconds. After 30 seconds, the applied pressure is removed and the wipe is immediately weighed using the laboratory balance. The difference in weight of the wipe before the pressure is applied and after the pressure is applied and removed is the cumulative wipe fluid loss value for the side of the wipe facing the filter paper layers. A fresh wipe fresh filter paper is used for each measurement of cumulative wipe fluid loss value that is made.

Specimens of wipe 10 were constructed as follows. All components of the wipe, except the core, had dimensions of 8.89 cm by 11.43 cm. The core had dimensions of 7.94 cm by 11.43 cm. The core formed part of the longitudinal edge bonds and was not part of the lateral edge bonds. The wipe consisted of the following layers, progressing from the first side to the second side: a 25 gram per square meter polyethylene vacuum formed film sold as product ID PT02 by Clopay and a 28 gram per square meter 50/50 polyethylene sheath/polypropylene core bi-component fiber laminated together using the process in U.S. Pat. No. 5,628,097, issued to Benson and Curro, on May 13, 1997; a layered core of a laminate of an 80 gram per square meter nonwoven of bicomponent fibers, the bicomponent fibers comprising a polyethylene sheath and a polyethylene terephthalate core having a loft of about 2.5 mm overlying two layers of a multi bonded air-laid core comprising about 15% by weight bicomponent fibers having a polyethylene sheath and polyethylene terephthalate core, about 2.5% by weight latex, about 82% pulp, and a basis weight of about 135 grams per square meter; two layers of 15 gram per square meter polypropylene nonwoven, and the bottom layer was laminate of a 60 gram per square meter SOFSPAN 120 nonwoven, available from Fiberweb and a polypropylene fine square structure net PF40 sold by Smith and Nephew Extruded Films, East Yorkshire, England, the layers being combined following the process in U.S. Pat. No. 7,917,985 issued to Dorsey et al. on Apr. 5, 2011, with the net material being on the second side of the wipe/oriented towards the exterior of the wipe. Each wipe was loaded with 19 g+/−0.3 g of cleaning composition according to Table 1.

The cumulative wipe fluid loss value of the side of the wipe having the netting material was 7.86 g with a standard deviation of 0.15 g, based on the average of six specimens tested. The cumulative wipe fluid loss value of the side of the wipe having the vacuum formed film was 9.92 g with a standard deviation of 0.30 g, based on the average of six specimens tested. The cumulative wipe fluid loss value of the side of the wipe having the netting material was 26% greater than the cumulative wipe fluid loss value of the side of the wipe having the vacuum formed film.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A premoistened cleaning wipe comprising:
    a liquid permeable first layer joined in facing relationship to a liquid permeable second layer, wherein said second layer comprises a substrate and a layer of netting material bonded to said substrate;
    a core disposed between said first layer and said second layer; and
    a free liquid cleaning composition comprising between about 0.001% to about 10% by weight of said liquid cleaning composition of surfactant, said cleaning composition releasably absorbed in said core;
    wherein said first layer forms a first side of said wipe and said wipe has a second side opposing said first side, wherein said first side and said second side each have an individual cumulative wipe fluid loss value and said cumulative wipe fluid loss value of said first side and said cumulative wipe fluid loss value of said second side differ by more than about 10%.

2. The premoistened cleaning wipe according to claim 1, wherein said netting material comprises broken strands.

3. The premoistened cleaning wipe according to claim 2, wherein said netting material comprises two sets of strands wherein each set of strands crosses and interconnects another set of strands at a substantially fixed angle wherein the strands in each set of strands extend along a respective direction and are in substantially coplanar, spaced apart relationship.

4. The premoistened cleaning wipe according to claim 3, wherein said broken strands form raised whiskers that extend away from the substrate.

5. The premoistened cleaning wipe according to claim 4, wherein said substrate is a woven or nonwoven material.

6. The premoistened cleaning wipe according to claim 1, wherein said first layer is an apertured film.

7. The premoistened cleaning wipe according to claim 1, wherein said wipe is sized and dimensioned to conform to an adult human hand.

8. The premoistened cleaning wipe according to claim 1, wherein said core is a material selected from the group consisting of polyolefin fibers, cellulose fibers, rayon, open celled foam, and combinations thereof.

9. The premoistened cleaning wipe according to claim 1, wherein said first layer comprises a laminate of an apertured formed film and a nonwoven.

10. The premoistened cleaning wipe according to claim 9, where said nonwoven is free from apertures.

11. The premoistened cleaning wipe according to claim 1, wherein said first layer is a nonwoven comprising polyolefin fibers.

12. The premoistened cleaning wipe according to claim 1, wherein said first layer, said second layer, and said core are coextensive with one another along a longitudinal axis.

13. The premoistened cleaning wipe according to claim 1, wherein said first layer and said second layer extend longitudinally beyond said core and extend further away from a longitudinal centerline than said core.

14. The premoistened cleaning wipe according to claim 1, wherein said first layer forms a first side of said wipe, wherein said first side of said wipe comprises one or more embossed channels embossed into said core.

15. The premoistened cleaning wipe according to claim 1, wherein said cumulative wipe fluid loss value of said second side is more than 10% greater than said cumulative wipe fluid loss value of said first side.

16. The premoistened cleaning wipe according to claim 1, wherein said cleaning wipe has a longitudinal axis and wherein said first layer and said second layer extend further away from said longitudinal axis than said core.

17. The premoistened cleaning wipe according to claim 1, wherein said liquid cleaning composition further comprises an antifoam compound.

* * * * *